United States Patent
Sen et al.

(10) Patent No.: US 9,787,333 B2
(45) Date of Patent: Oct. 10, 2017

(54) SUBCARRIER POWER REALLOCATION

(71) Applicant: HEWLETT PACKARD ENTERPRISE DEVELOPMENT LP, Houston, TX (US)

(72) Inventors: Souvik Sen, Palo Alto, CA (US); Jung Gun Lee, Palo Alto, CA (US); Tom Hogan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/917,068

(22) PCT Filed: Sep. 13, 2013

(86) PCT No.: PCT/US2013/059632
§ 371 (c)(1),
(2) Date: Mar. 7, 2016

(87) PCT Pub. No.: WO2015/038141
PCT Pub. Date: Mar. 19, 2015

(65) Prior Publication Data
US 2016/0218756 A1 Jul. 28, 2016

(51) Int. Cl.
*H04K 1/02* (2006.01)
*H04L 25/03* (2006.01)
(Continued)

(52) U.S. Cl.
CPC ......... *H04B 1/0475* (2013.01); *H04B 7/0426* (2013.01); *H04L 27/2626* (2013.01);
(Continued)

(58) Field of Classification Search
CPC .............. H04L 27/2647; H04L 5/0007; H04L 27/2657; H04L 27/2662; H04L 5/0048;
(Continued)

(56) References Cited

U.S. PATENT DOCUMENTS 7,260,361 B2 * 8/2007 Jacobsen ............. H04L 27/2608
370/210
7,286,609 B2 * 10/2007 Maltsev ............... H04W 52/346
375/130

(Continued)

FOREIGN PATENT DOCUMENTS

WO WO-2011/141064 A1 11/2011

OTHER PUBLICATIONS

International Search Report and Written Opinion, International Application No. PCT/US2013/059632, Date: Jun. 20, 2014, pp. 1-15.

(Continued)

*Primary Examiner* — James M Perez
(74) *Attorney, Agent, or Firm* — Hewlett Packard Enterprise Patent Department

(57) ABSTRACT

A first set of subcarriers having signal-to-noise ratio (SNR) values that exceed a target SNR value is identified at a transmitter. A second set of subcarriers having SNR values below the target SNR value is identified. Power is iteratively reallocated from the first and second set of subcarriers to a third set of subcarriers having SNR values below the target value but closer to the target SNR value than the second set of subcarriers.

20 Claims, 4 Drawing Sheets

(51) Int. Cl.
*H04L 25/49* (2006.01)
*H04B 1/04* (2006.01)
*H04B 7/0426* (2017.01)
*H04W 52/34* (2009.01)
*H04L 27/26* (2006.01)
*H04B 7/12* (2006.01)

(52) U.S. Cl.
CPC ............ *H04W 52/346* (2013.01); *H04B 7/12* (2013.01); *H04B 2001/0416* (2013.01)

(58) Field of Classification Search
CPC ............ H04L 27/368; H04L 25/03343; H03F 1/3247; H03F 1/3294; H03F 2201/3233
USPC .................. 375/259–285, 295–315
See application file for complete search history.

(56) References Cited

U.S. PATENT DOCUMENTS

| | | | | |
|---|---|---|---|---|
| 7,313,195 B2* | 12/2007 | Chen | ................... | H04L 27/2614 375/286 |
| 7,349,436 B2* | 3/2008 | Maltsev | ............... | H04L 5/0053 370/471 |
| 7,421,015 B2* | 9/2008 | Sedarat | ............... | H04L 27/2608 375/222 |
| 7,539,123 B2* | 5/2009 | Rhodes | ................ | H04L 5/0046 370/208 |
| 7,826,435 B1 | 11/2010 | Wu et al. | | |
| 8,351,967 B2* | 1/2013 | Jia | ................ | H04B 7/0417 375/299 |
| 8,675,794 B1* | 3/2014 | Perets | ................... | H04L 1/0003 375/225 |
| 9,143,218 B2* | 9/2015 | Etkin | ................ | H04L 25/0206 |
| 9,362,993 B2* | 6/2016 | Stadelmeier | ......... | H04B 7/0426 |
| 9,456,369 B2* | 9/2016 | Lee | ................ | H04W 24/08 |
| 2003/0108095 A1* | 6/2003 | Duvaut | ................... | H04L 12/66 375/222 |
| 2003/0125040 A1* | 7/2003 | Walton | ................ | H04B 7/0417 455/454 |
| 2004/0127245 A1* | 7/2004 | Sadri | ................... | H04W 52/42 455/522 |
| 2004/0190636 A1* | 9/2004 | Oprea | ................ | H04B 7/0417 375/260 |
| 2005/0031047 A1* | 2/2005 | Maltsev | ............... | H04W 52/346 375/260 |
| 2005/0032514 A1* | 2/2005 | Sadri | ................... | H04W 52/346 455/423 |
| 2005/0047517 A1* | 3/2005 | Georgios | ............. | H04B 7/0417 375/267 |
| 2005/0053164 A1* | 3/2005 | Catreux | ............... | H04B 7/0615 375/260 |
| 2005/0078707 A1* | 4/2005 | Maltsev | ................ | H04L 5/0053 370/471 |
| 2005/0213405 A1* | 9/2005 | Stopler | ............... | H04L 27/2608 365/203 |
| 2006/0039312 A1* | 2/2006 | Walton | ................... | H04L 1/06 370/319 |
| 2006/0072677 A1* | 4/2006 | Kwak | ................ | H04B 7/0417 375/260 |
| 2006/0153309 A1* | 7/2006 | Tang | ................... | H04L 27/2608 375/260 |
| 2007/0058583 A1* | 3/2007 | Cho | ........................ | H04L 47/10 370/329 |
| 2007/0121746 A1* | 5/2007 | Cho | ........................ | H04L 5/023 375/260 |
| 2007/0147534 A1* | 6/2007 | Horng | ................ | H04W 52/346 375/267 |
| 2008/0205491 A1* | 8/2008 | Berens | ................ | H04B 1/1036 375/148 |
| 2008/0205544 A1* | 8/2008 | Berens | ................ | H04B 1/1036 375/285 |
| 2009/0086706 A1* | 4/2009 | Huang | ................ | H04L 1/0026 370/349 |
| 2009/0135934 A1* | 5/2009 | Guerrieri | ................ | H04L 1/004 375/262 |
| 2010/0020757 A1* | 1/2010 | Walton | ..................... | H04L 1/06 370/329 |
| 2010/0061473 A1* | 3/2010 | Choi | ..................... | H04L 1/0003 375/260 |
| 2011/0194644 A1* | 8/2011 | Liu | ....................... | H04L 5/0023 375/295 |
| 2012/0033753 A1* | 2/2012 | Hamaguchi | ........... | H04L 5/0044 375/260 |
| 2012/0046056 A1 | 2/2012 | Luo et al. | | |
| 2012/0063336 A1* | 3/2012 | Shany | ................... | H04B 7/0452 370/252 |
| 2012/0087435 A1* | 4/2012 | Gomadam | ........... | H04B 7/0452 375/285 |
| 2012/0120881 A1* | 5/2012 | Kalhan | ................ | H04L 5/0007 370/329 |
| 2013/0028344 A1* | 1/2013 | Chen | ................... | H04B 7/0417 375/267 |
| 2014/0219120 A1* | 8/2014 | Larsson | ............. | H04W 52/267 370/252 |
| 2014/0241273 A1* | 8/2014 | Kim | ....................... | H04J 11/005 370/329 |
| 2014/0294108 A1* | 10/2014 | Etkin | ..................... | H04B 7/066 375/267 |
| 2015/0003597 A1* | 1/2015 | Kuipers | ................... | H04B 3/32 379/93.08 |
| 2015/0078470 A1* | 3/2015 | Etkin | ................ | H04L 25/0206 375/267 |
| 2016/0173403 A1* | 6/2016 | Mogul | ..................... | G06F 9/50 709/226 |
| 2016/0191215 A1* | 6/2016 | Lee | ..................... | H04B 7/0626 375/260 |
| 2016/0277076 A1* | 9/2016 | Stadelmeier | ......... | H04B 7/0426 |

OTHER PUBLICATIONS

N.Y Ermolova and B. Makarevitch, "Power Loading for OFDM with Incomplete Channel State Information," PIMRC'07, Sep. 3-7, 2007, pp. 1-5, IEEE.

* cited by examiner

SUBCARRIER POWER REALLOCATION

BACKGROUND

Performance of a wireless link depends on the quality of the channel between a transmitter and a receiver. Channel quality between the transmitter and the receiver depends on two parameters—path-loss and frequency selective fading. While path-loss increases with distance between the transmitter and the receiver, frequency selective fading is a consequence of the multipath characteristics between the transmitter and the receiver.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
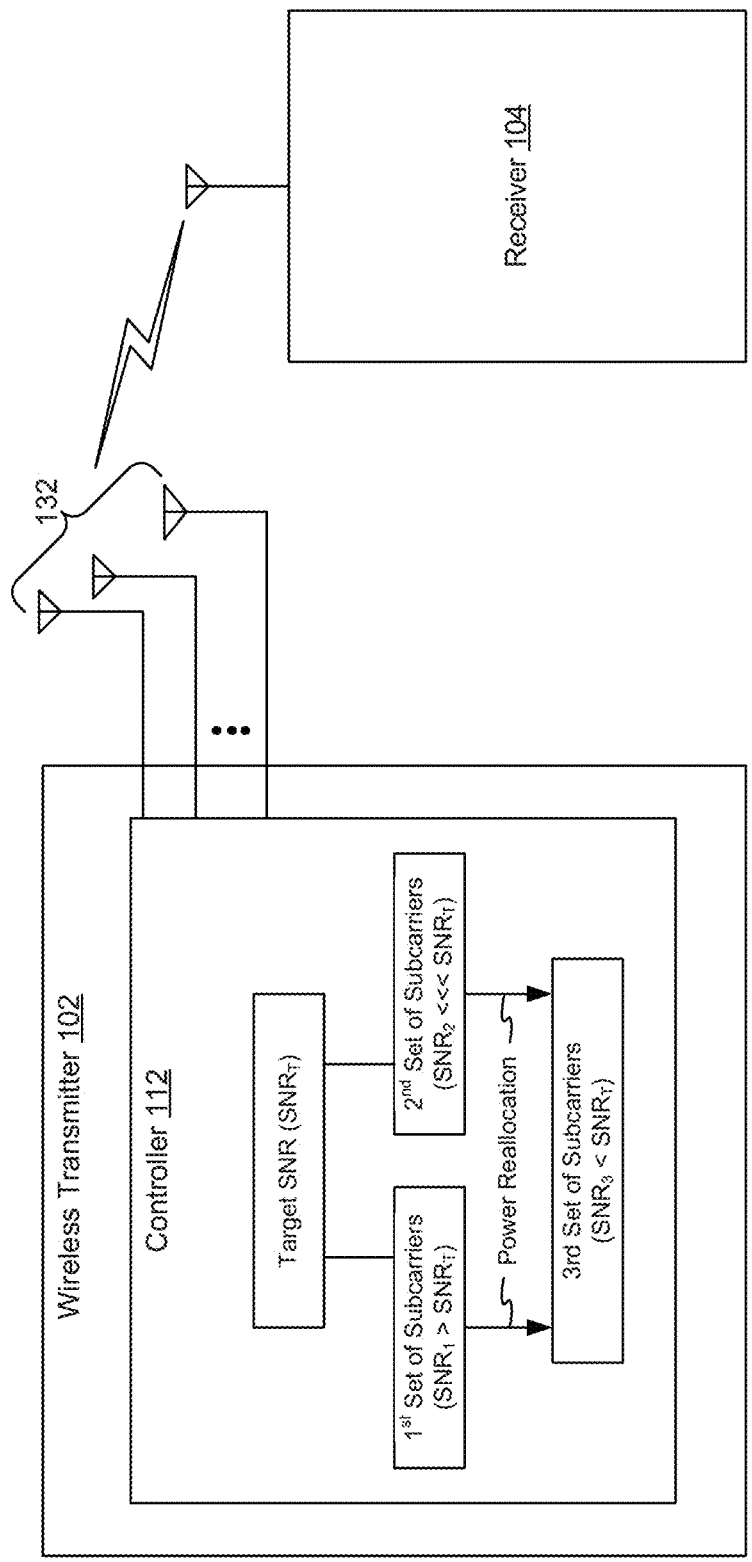
FIG. 1 is a block diagram of a wireless transmitter including a controller for reallocating power among subcarriers, according to one example.

A wireless signal from the transmitter to the receiver traverses through multiple paths, undergoing reflections, diffractions, and scattering. Thus the received signal at the receiver contains multiple time-delayed, attenuated, and phase-shifted copies of the original signal. Most digital radios use orthogonal frequency-division multiplexing (OFDM) standard (i.e., a method of encoding digital data on multiple carrier frequencies) for communication, and transmit signal across orthogonal subcarriers are different phases. Each transmitted symbol X(f) is modulated on a different subcarrier f, and the quality of the received symbol Y(f) will depend on the channel H(f):

$$Y(f)=H(f)X(f) \quad \text{Equation (1)}$$

where the vector $H=H(f)_{f=1:F}$ is the channel state information (CSI), a complex vector that describes the channel quality at each subcarrier, and F is the total number of subcarriers. For example, an institute of electrical and electronics engineers (IEEE) 802.11a/g/n standards receiver implements 64 such subcarriers and includes channel estimation logic in the hardware that can estimate the CSI from a received packet. Further, some currently available chipsets can export the CSI to a driver of the device. Thus, CSI describes the propagation characteristics of a link (or a communications channel) between the transmitter and the receiver.

If the signal from the transmitter arrives at the receiver along D unique paths, the attenuation of path p is $\alpha_p$, the phase is $\phi_p$, and the frequency of subcarrier f is fc, then the CSI can be expressed as:

$$H(fc)=\Sigma\alpha_p e^{-j2\pi fc\phi p} \quad \text{Equation (2)}$$

From Equation (2), it is clear that the quality of the channel is dependent not only on the path characteristics (i.e., attenuation and phase), but also on the frequency of the subcarrier, fc. The quality of the channel at a particular subcarrier, fc depends on how the D paths combine at the particular subcarrier. At a particular frequency, the exponential terms (i.e., $e^{-j2\pi fc\phi p}$) may all align in phase, thereby improving the channel quality (|H(fc)|). However, at some other frequencies, the exponential terms of Equation (2) may actually cancel each other, resulting in a weak channel. This phenomenon is referred to as frequency selective fading because the channel quality varies across frequencies (or subcarriers).

For example, at certain frequencies, the channel may be "strong" (i.e., strong signal strength) and on other frequencies, the channel may be "weak" (i.e., weak signal strength). Thus, for a given channel, the performance of the wireless link depends on the distribution of the weak frequencies/subcarriers (i.e., the proportion of weak frequencies/subcarriers). For example, the average channel quality (captured by received signal strength indication (RSSI) metric) of two link may be the same; however their performances may be different due to the presence of weak subcarriers (i.e., the nature of the frequency selective fading). Similarly links with the same performance may have different average channel qualities.

Accordingly, examples described herein address the above challenges of frequency selective fading by providing a technique for reallocating power on different subcarriers at a transmitter. The described examples leverage a finding that the performance of a wireless link is governed by the signal strength (e.g., signal-to-noise ratio (SNR)) achieved by a majority number of subcarriers, and that the number of very strong or very weak subcarriers (i.e., channel quality of the subcarrier) do not play a significant role. Thus, the fraction of subcarriers achieving a target signal strength may be significantly increased by reducing the allocated power of the strongest and weakest subcarriers, and redistributing the saved power to weaker subcarriers closer to the target signal strength than the weakest subcarriers. Accordingly, the described examples maximize the delivery ratio of a transmission by intelligently reallocating power among a plurality of subcarriers under the constraints on fixed total transmission power and per subcarrier power, and the modulation and coding schemes employed by the transmitter. In some examples, multiple antennas from the transmitter are allocated per subcarrier, and in other examples one antenna is allocated per subcarrier (e.g., using space frequency coding (SFC)).

In one example, a method includes identifying, at a transmitter, a first set of subcarriers of a plurality of subcarriers having signal-to-noise ratio (SNR) values that exceed a target SNR value, and identifying a second set of subcarriers having SNR values below the target SNR value. The method also includes iteratively reallocating power from the first and second set of subcarriers to a third set of subcarriers having SNR values below the target SNR value but closer to the target SNR value that the second set of subcarriers.

In another example, a wireless transmitter includes a plurality of antennas to transmit a signal from the transmitter to a receiver, and a controller. The signal is encoded on a plurality of subcarriers and at least one antenna is allocated to at least one subcarrier. The controller is to determine a minimum number of subcarriers to achieve a target signal-to-noise ratio (SNR) value for delivery of the transmitted signal using a predetermined modulation and coding rate. The controller is to identify a first set of subcarriers of a plurality of subcarriers having SNR values that exceed the target SNR value, and to identify a second set of subcarriers having SNR values that are below the target SNR value. The controller is to iteratively reallocate power from the first and second set of subcarriers to a third set of subcarriers having SNR values that are below the target SNR value but closer to the target SNR value than the second set of subcarriers, until the minimum number is reached.

In another example, a non-transitory computer-readable storage medium includes instructions that, when executed by a processor of a wireless transmitter, causes the processor to determine a minimum number of subcarriers to achieve a target signal-to-noise ratio (SNR) value for delivery of a signal using a particular modulation and coding rate. The instructions are executable to identify a first set of subcarriers of a plurality of subcarriers having SNR values that exceed the target SNR value, and to identify a second set of subcarriers having SNR values that are below the target SNR value. The instructions are executable to iteratively reallocate power from the first and second set of subcarriers to a third set of subcarriers having SNR values that are below the target SNR value but closer to the target SNR value than the second set of subcarriers, until the minimum number of subcarriers for is reached.

As used herein, multiple subcarrier modulation systems involve a data signal of successive symbols (one or more bits of data) split into multiple several lower rate signals (i.e., multiple subcarrier signals). The term "subcarrier" is used because although the data signal is modulated onto carriers of different frequencies, each "carrier" only carries a fraction of the data signal. As used herein, "signal-to-noise ratio" or "SNR" is a metric that compares the level of a desired signal to the level of background noise. SNR is the ratio of signal power to the noise power, often expressed in decibels (dB). As used herein, "modulation and coding rate" or "modulation and coding scheme" is a link adaptation that denotes the matching of the modulation, coding, and other signal and protocol parameters to the conditions on the radio link (e.g., the pathloss, the interference due to signals coming from other transmitters, the sensitivity of the receiver, the available transmitter power margin, etc.). Thus, modulation and coding rate/scheme impacts the transmission rate of the transmitter. For example, modulation and coding rate reflects a bit-rate that is supported by the transmitter, where the bit-rate is the number of bits that are conveyed or processed per unit of time. As used herein, "data stream(s)" is a sequence of digitally encoded coherent signals (e.g., packets of data or data packets) used to transmit or receive information that is in the process of being transmitted. As used herein, "channel state information" or "CSI" refers to known (or inferred) channel properties of a communication link. CSI describes how a signal propagates from a transmitter to a receiver and represents the combined effect of, for example, scattering, fading, and power decay with distance. In the described examples, a signal (containing data streams) may be encoded, projected, or modulated on multiple subcarriers. Further, multiple transmit antennas may be allocated to each subcarrier, or one transmit antenna may be allocated per subcarrier.

With reference to the figures, FIG. 1 is a block diagram of a wireless transmitter including a controller for reallocating power among subcarriers, according to one example. Transmitter 102 is an electronic device which, with the aid of one or more antennas (e.g., plurality of antennas 132), produces radio waves. Transmitter 102 is to wirelessly communicate radio waves (e.g., signal or data) with receiver 104. Transmitter 102 may be part of another electronic device that communicates by radio, such as a cellular device, a smartphone, a personal computer, a notebook computer, a tablet computing device, a personal digital assistant (PDA), a wireless access point, a wireless router, or any other communication device. Similarly, receiver 104 may be incorporated into any of the above devices. Transmitter 102 can be combined in one unit with a receiver, as a transceiver.

Transmitter 102 includes a controller 112 coupled to the plurality of antennas 132. Controller 112 may be hardware and/or software for reallocating power among a plurality of subcarriers. In particular, controller 112 may be configured to iteratively reallocate power from a first set of subcarriers having SNR values that exceed the target SNR value, and from a second set of subcarriers having SNR values that are below the target SNR value, to a third set of subcarriers having SNR values that are below the target SNR value, but closer to the target SNR value than the second set of subcarriers.

As explained above, if the proportion of weak subcarriers can be reduced, wireless performance of the communication link may be improved. This may be achieved by using additional power on the weaker subcarriers. However, the total transmission power in a wireless system cannot surpass a fixed limit. Moreover, government regulatory bodies in many countries limit the amount of power that can be allocated on subcarriers. For example, in the United States, the Federal Communications Commission (FCC) limits the amount of power that can be allocated on a particular subcarrier. The FCC aims to overcome the increase in energy radiated in an given direction by reducing th allowed transmission power by a factor of 10 log(#antennas/#data streams), where #antennas is the number of antennas used for a transmission, and #data streams is the number of data streams to be transmitted. Thus, it may not be possible to allocate an arbitrary amount of power to the weaker subcarriers. On the other hand, there may be many subcarriers that are stronger than the target SNR to support a given modulation and coding scheme. Thus, it may be possible to reallocate power from such strong subcarriers and provide the power to the weak subcarriers.

If M and C are the modulation and coding schemes, respectively, used by the wireless transmitter 102, then the delivery ratio of the transmission is a function F of M and C. Accordingly, controller 112 can be configured to maximize the delivery ratio under the constraints of the fixed total transmission power and the regulatory constraints on per subcarrier power described above.

In one example, where multiple antennas 132 are available at the transmitter 102 to be allocated to any subcarrier, if the total transmit power is $P_T$ and the maximum amount of power that can be allocated to any subcarrier from all the transmit antennas 132 is $P_U$, then the controller 112 can allocate power to any subcarrier from the transmit antennas 132 based on a solution of the optimization function:

$$\text{maximize } F(M,C) \text{ such that } P_U \geq \Sigma_{i=1}^{K} P_{i,j} \geq 0 \text{ and}$$
$$\Sigma_{i=1}^{K}\Sigma_{j=1}^{N} P_{i,j} \leq P_T \quad \text{Equation (4)}$$

where K is the number of antennas, N is the number of subcarriers, and $P_{i,j}$ is the amount of power allocated from antenna i to subcarrier j. Accordingly, based on the function F, power can be allocated across all the subcarriers such that a transmission using the specified (or predetermined) modulation and coding rate can be successfully delivered. Equation (4) above describes a power allocation matrix that has a size K×N that specifies the transmission power for each subcarrier and antenna combination (i.e., $P_{i,j}$). $P_T$ is the total allowed regulatory transmit power (e.g., FCC regulations) and represents a constraint on transmit power using multiple antennas. For example, transmit power constraint may depend on the number of transmit antennas and the number of data streams transmitted (e.g., 10 log (#antennas/#data streams)).

In another example, where only a single antenna is allocated per subcarrier, the optimization function of Equation (4) can be modified accordingly. For example, only a single antenna is used per subcarrier in cases where using multiple antennas per subcarriers can diminish performance due to FCC regulations. As explained above, according to FCC regulations, if multiple antennas are used to transmit on a single subcarriers, such transmissions are subject to a transmit power constraint that depends on the number of transmit antennas and the number of data streams transmitted (i.e., 10 log(#antennas/#data streams)). One way to address this regulatory constraint as well as address the issue of frequency selective fading is to allocate only a single antenna per subcarrier. In this scenario, space frequency coding (SFC) can be applied, where an antenna is selected for each subcarrier. By using one antenna per subcarrier, the effect of the transmit power constraint of 10 log (#antenna/#data streams) may be significantly reduced. It should be noted that the amount of power that can be allocated for a single antenna per subcarrier is limited by $P_U$. Accordingly, the optimization function of Equation (4) can be modified to be usable for the one antenna per subcarrier scenario as follows:

$$\sum_{\substack{i=1 \\ i \neq S}}^{K} P_{i,j=0} \text{ and } P_U > P_{S,j} \geq 0 \qquad \text{Equation (5)}$$

where S is the antenna which should transmit on subcarrier j. Accordingly, Equations (4) and (5) provide a solution for optimal power allocation in cases where multiple antennas are used per subcarrier, and where only a single antenna is used per subcarrier, respectively for a given modulation and coding rate.

Wireless performance depends on the modulation and coding scheme employed. For example, using modulation, the transmitter 102 can encode different number of bits within the same symbol. To illustrate binary phase-shift keying (BPSK) modulation scheme encodes 1 bit per symbol, quadrature phase-shift keying (QPSK) modulation scheme encodes 2 bits per symbol, and several other modulation schemes encode a specific number of bits per symbol. To arrive at a particular or predetermined modulation and coding rate based on the target SNR, the bit-rate (i.e., number of bits that can be conveyed per second, and a function of the modulation and coding rate) can be iteratively increased until the target SNR can no longer be achieved. A highest bit-rate that supports the target SNR is selected as the predetermined modulation and coding rate. To illustrate, given the target SNR value, the bit-rate can be iteratively increased from 1, 2, 3, . . . , to n, where n is the highest possible bit-rate that will still support the target SNR.

The per-subcarrier SNR to support a particular modulation scheme for a given packet size can be derived by using well known theoretical formulas. The SNR of the different subcarriers at the receiver 104 varies due to frequency selective fading. If the SNR of a particular subcarrier is below the target SNR for the modulation rate, the bit(s) received on the particular subcarrier may likely be corrupted. However, coding can offset some of these errors. For example, in a Wi-Fi network, 1/2 coding rate can recover up to 2 errors within a window of every 7 bits. Thus, even if some subcarriers cannot meet the target SNR for the given modulation, it may still be possible to successfully deliver the transmission if the coding scheme can correct the errors.

Thus, by intelligently allocating the power to increase the number of subcarriers that can achieve the target SNR, the delivery ratio can be increased. Moreover, interleaving technique in IEEE 802.11, for example, uniformly distributes errors after modulation, making it possible to determine the number of bit-errors that can be corrected due to low SNR on a few subcarriers, for a particular coding scheme.

Accordingly, the number of subcarriers that achieve the target SNR can be increased by reallocating power from strong subcarriers (i.e., subcarriers that exceed the target SNR) and from weak subcarriers (i.e., subcarriers that are far below the target SNR). First, power can be removed from the stronger subcarriers if their SNR values are higher than the target SNR. Second, power can be removed from weak subcarriers if their SNR values are low such that it may not be possible to meet the target SNR due to the constraints on allocated power per subcarrier. For example, the controller 112 can reduce the amount of power in one or more transmitters 132 associated with the stronger subcarriers whose SNR values are higher than the target SNR, and from the weak subcarriers whose SNR values are much lower than the target SNR. Thus, by removing power from both the stronger and weaker subcarriers, and reallocating the removed power to other subcarriers that are just below the target SNR, the number of subcarriers that have SNR values equal to or greater than the target SNR can be maximized.

Thus, the controller 112 is configured to identify the stronger set of subcarriers from the plurality of subcarriers whose SNR values are higher than the target SNR value. Power is then reduced from the stronger set of subcarriers until the remaining power at the stronger set of subcarriers supports the target SNR value (or until the SNR value of the stronger set of subcarriers is at least equal to the target SNR value). If the SNR of a subcarrier j in absolute scale is $S_j$, and the target SNR is $P_T$, then the allocated power $P_j$ on the same subcarrier after power reduction will be:

$$P_j = \left(\frac{P_T}{S_j}\right) * P_A \qquad \text{Equation (6)}$$

where $P_A$ is the average power per subcarrier. The saved power can be reallocated to other subcarriers so that a few more subcarriers can meet the target SNR. To maximize the number of such subcarriers, power can be reallocated to subcarriers with the highest SNR values below the target SNR value (i.e., subcarriers with SNR values just lower than the target SNR but closest compared to other weak subcarriers) and increase its power allocation according to Equation (6). Accordingly, the total power redistributed in this manner cannot be more than the saved power. Thus, the saved power is iteratively reallocated over all the weak subcarriers until the saved power is depleted. By reallocating power in this manner, it may be possible that all the subcarriers surpass the target SNR. However, in some cases, after power reallocation, not all the subcarriers can surpass the target SNR. In such cases, power can be reallocated until the number of subcarriers to meet the target SNR for delivery of a transmission is achieved.

As explained earlier, coding can correct the errors due to a few subcarriers not meeting the target SNR. Thus, depending on the coding and modulation rate, it is possible to determine the number of subcarriers that should meet the target SNR for a given bit-rate to succeed (i.e., for delivery of the transmitted signal). If after reallocating the power saved from the stronger set of subcarriers, more than the predetermined number of subcarriers has an SNR higher than the target SNR, the target bit-rate can be achieved. Otherwise, the controller 112 next considers the weaker set of subcarrier which cannot meet the target SNR even by allocating the highest possible power to them, given the regulatory constraints.

To identify the set of weak subcarriers, it should be noted that many receivers implement soft decision detection, where information decoded from individual subcarriers is weighted according to how probable the information is to contain an error. When it is known that the receiver 104 implements such a soft decision detector, it is possible to duplicate the weighting process at the transmitter 102 and use it in combination with channel state information (CSI) to identify the subcarriers that will be zeroed or minimally weighted at the receiver 104. This weighting information can be used to prioritize those subcarriers that are zeroed or underweighted as potential candidates to reallocate power from. Because such subcarriers are prioritized as described above, power can be removed from the weak subcarriers in increasing order of strength. For example, power can be removed from the weakest subcarriers and reallocated to weaker subcarriers which are just below the target SNR. This process is performed iteratively until the predetermined number of subcarriers having an SNR value at least equal to the target SNR value is reached. If however, there are no more saved power to reallocate and the minimum number of subcarriers with at least the target SNR has not been reached, then it is possible that the selected modulation and coding rate cannot be achieved, and thus the modulation and coding rate can be lowered.

Figure 2:
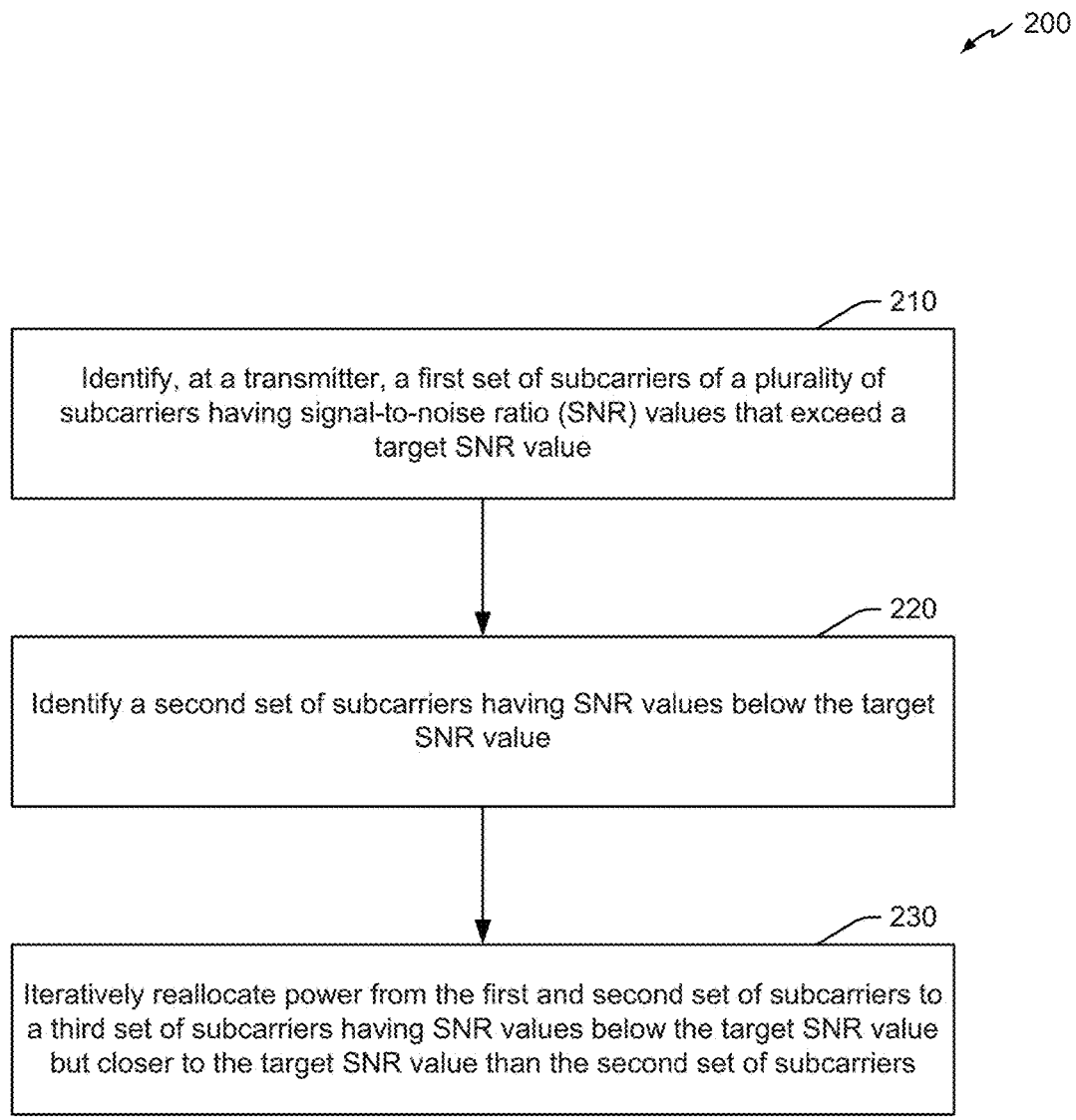
FIG. 2 is a flowchart of a method for reallocating power among subcarriers, according to one example.

FIG. 2 is a flowchart of a method for reallocating power among subcarriers, according to one example. Method 200 may be implemented, for example, in the form of executable instructions stored on a non-transitory computer-readable storage medium and/or in the form of electronic circuitry.

Method 200 includes identifying, at a transmitter, a first set of subcarriers of a plurality of subcarriers having signal-to-noise (SNR) values that exceed a target SNR value, at 210. For example, the controller 112 can determine a target SNR value for a given transmission and compare the SNR values of the plurality of subcarriers to the target SNR value to identify the first set of subcarriers that have SNR values at least equal to the target SNR value.

Method 200 includes identifying a second set of subcarriers having SNR values below the target SNR value, at 220. For example, the controller 112 can compare the SNR values of the plurality of subcarriers to the target SNR value to identify the second set of subcarriers that have SNR values below the target SNR value. In certain examples, the second set of subcarriers can be identified based on a combination of the channel state information and a weighting algorithm to identify subcarriers that are likely to be zeroed or minimally weighted at the receiver. For example, the second set of subcarriers can include subcarriers that cannot meet the target SNR value even when power is provided (given maximum power constraints) to such subcarriers.

Method 200 includes iteratively reallocating power from the first and second set of subcarriers to a third set of subcarriers having SNR values below the target SNR value but closer to the target SNR value than the second set of subcarriers, at 230. For example, power can be removed or reduced from the identified first and second set of subcarriers and iteratively reallocated to a third set of subcarriers with SNR values closer to the target SNR value than the second set of subcarriers. In certain examples, power is first removed from the first set of subcarriers having SNR values higher than the target SNR value until the first set is exhausted and such that the first set of subcarriers are each left with SNR values at least equal to the target SNR value. Power is then removed from the second set of subcarriers and iteratively reallocated to the third set of subcarriers. In other examples, the iterative reallocation is performed until there are no more subcarriers in the first and second set of subcarriers to reallocate power from and/or until there are no more subcarriers in the third set of subcarriers to reallocate power to.

Figure 3:
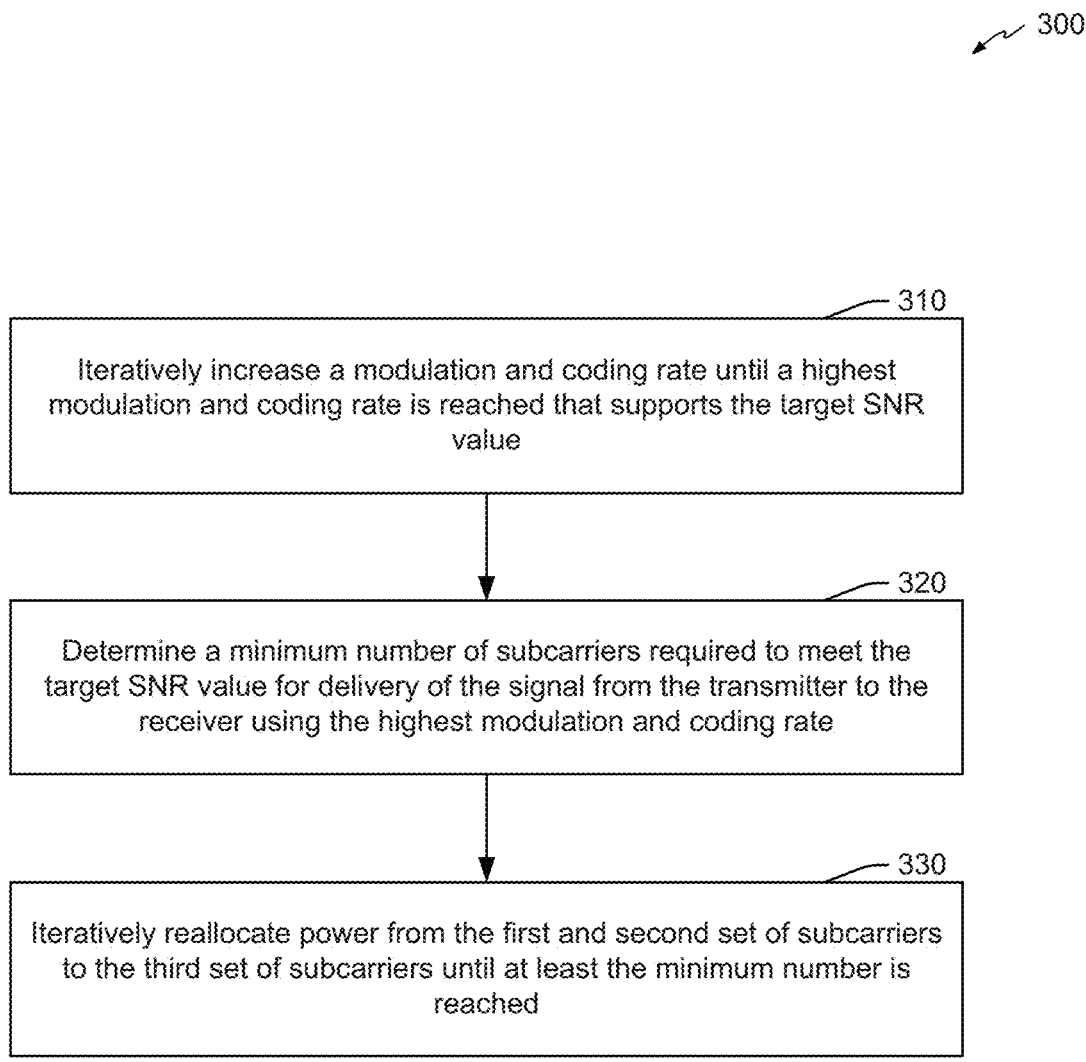
FIG. 3 is a flowchart of a method for reallocating power among subcarriers, according to one example.

FIG. 3 is a flowchart of a method for reallocating power among subcarriers, according to one example. Method 300 may be implemented, for example, in the form of executable instructions stored on a non-transitory computer-readable storage medium and/or in the form of electronic circuitry.

Method 300 includes iteratively increasing a modulation and coding rate until a highest modulation and coding rate is reached that supports the target SNR value, at 310. For example, the controller 112 can iterate through a set of bit-rates to find the highest possible bit-rate supported by the target SNR value. To illustrate the bit-rate may be increased by 1 Mbps until the highest Mbps that will support the target SNR value is reached. It should be noted that the bit-rate is a function of the modulation and coding rate used.

Method 300 includes determining a minimum number of subcarriers to achieve the target SNR value for delivery of the signal from the transmitter to the receiver using the highest modulation and coding rate, at 320. For example, the controller 112 can determine at least how many subcarriers from the plurality of available subcarriers may be needed to meet the target SNR in order to deliver the signal using the highest modulation and coding rate.

Method 300 also includes iteratively reallocating power from the first and second set of subcarriers to the third set of subcarriers until at least the minimum number is reached, at 330. For example, the controller 112 may continue to reallocate the power from the first and second set of subcarriers to the third set of subcarriers until at least the minimum number is reached.

Figure 4:
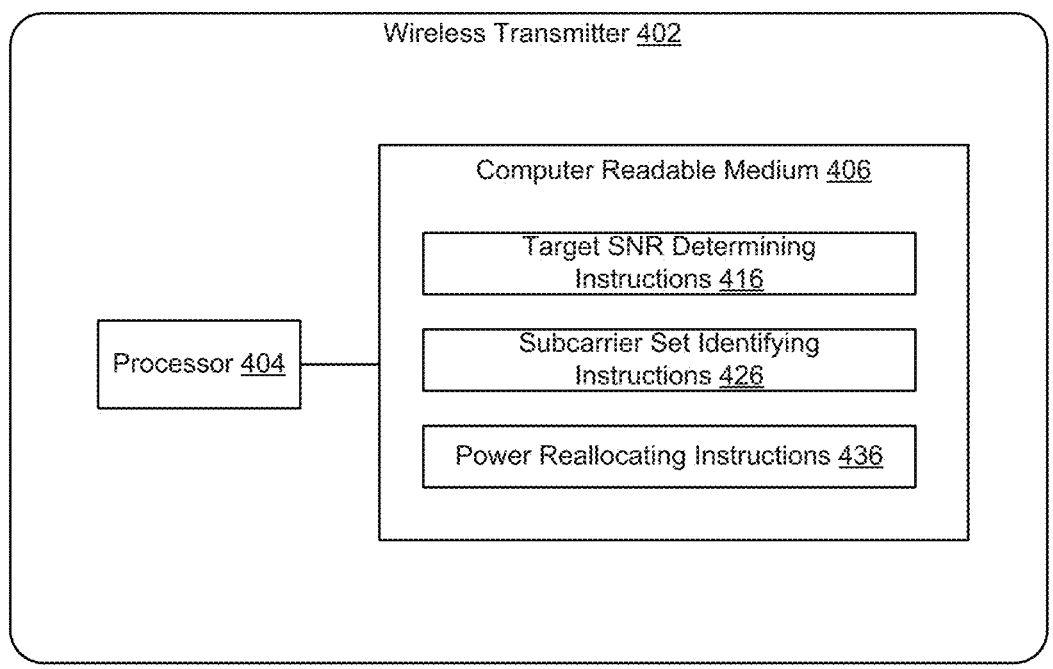
FIG. 4 is a block diagram of a wireless transmitter including a computer-readable medium having instructions for reallocating power among subcarriers, according to one example.

FIG. 4 is a block diagram of a wireless transmitter including a computer-readable medium having instructions for reallocating power among subcarriers, according to one example. Wireless transmitter 402 can include a non-transitory computer-readable medium 406 and a processor 404. The non-transitory computer-readable medium 406 can include instructions 416-436 that are executable by the processor 404 to carry out the functionality of the wireless transmitter 402.

For example, target SNR determining instructions 416 are executable to determine a minimum number of subcarriers to achieve a target SNR value delivery of a signal using a particular modulation and coding rate.

Subcarrier set identifying instructions 426 are executable to identify a first set of subcarriers of a plurality of subcarriers having SNR values that exceed the target SNR value, to identify a second set of subcarriers having SNR values that are below the target SNR value, and to identify a third set of subcarriers having SNR values that are below the target SNR value but closer to the target SNR value than the second set of subcarriers.

Power reallocating instructions 436 are executable to iteratively reallocate power from the first and set of subcarriers to the third set of subcarriers until at least the minimum number of subcarriers for successful transmission of the signal is reached.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations therefrom. It is intended that the appended claims cover such modifications and variations as fall within the true spirit and scope of the invention.

What is claimed is:

1. A method comprising:
identifying, at a transmitter, a first set of subcarriers of a plurality of subcarriers having signal-to-noise ratio (SNR) values that exceed a target SNR value;
identifying a second set of subcarriers having SNR values below the target SNR value; and
iteratively reallocating power from the first and second set of subcarriers to a third set of subcarriers having SNR values below the target SNR value but closer to the target SNR value than the second set of subcarriers, wherein the third set of subcarriers receives the reallocated power.

2. The method of claim 1, comprising:
determining a minimum number of subcarriers to achieve the target SNR value for delivery of a signal from the transmitter to a receiver using a predetermined modulation and coding rate prior to iteratively reallocating power; and
iteratively reallocating power from the first and second set of subcarriers to the third set of subcarriers until at least the minimum number of subcarriers is reached.

3. The method of claim 2, wherein the predetermined modulation and coding rate is selected by iteratively increasing a modulation and coding rate until a highest modulation and coding rate is reached that supports the target SNR value.

4. The method of claim 2, wherein the iterative reallocation is performed such that the first set of subcarriers are left with SNR values that are at least equal to the target SNR value, and wherein the iterative reallocation is performed such that at least one of the third set of subcarriers achieves an SNR value that is at least equal to the target SNR value.

5. The method of claim 1, wherein one antenna of a plurality of antennas of the transmitter is allocated per subcarrier of the plurality of subcarriers.

6. The method of claim 1, wherein iteratively reallocating power includes iteratively reallocating power from the first set of subcarriers before reallocating power from the second set of subcarriers.

7. The method of claim 1, wherein identifying the second set of subcarriers includes determining subcarriers that cannot meet the target SNR value even when power is reallocated to such subcarriers.

8. The method of claim 1, wherein the iterative reallocation is performed until there are no more subcarriers in the first and second set of subcarriers to reallocate power from, and wherein the iterative reallocation is performed until there are no more subcarriers in the third set of subcarriers to reallocate power to.

9. A wireless transmitter comprising:
a plurality of antennas to transmit a signal from the transmitter to a receiver, wherein the signal is encoded on a plurality of subcarriers, and wherein at least one antenna is allocated to at least one subcarrier; and
a controller to:
determine a minimum number of subcarriers to achieve a target signal-to-noise ratio (SNR) value for delivery of the signal using a predetermined modulation and coding rate;
identify a first set of subcarriers of a plurality of subcarriers having SNR values that exceed the target SNR value;
identify a second set of subcarriers having SNR values that are below the target SNR value; and
iteratively reallocate power from the first and second set of subcarriers to a third set of subcarriers having SNR values that are below the target SNR value but closer to the target SNR value than the second set of subcarriers, until at least the minimum number is reached.

10. The wireless transmitter of claim 9, wherein power is iteratively reallocated from the first set of subcarriers before being iteratively reallocated from the second set of subcarriers, and wherein a total transmit power of the transmitter is fixed.

11. The wireless transmitter of claim 9, the controller to perform the iterative reallocation of power according to a maximization function:

$$\text{maximize } F(M,C) \text{ such that } P_U \geq \Sigma_{i=1}^K P_{i,j} \geq 0 \text{ and}$$
$$\Sigma_{i=1}^K \Sigma_{j=1}^N P_{i,j} \leq P_T,$$

wherein K is a number of the plurality of antennas,
wherein N is a number of total subcarriers,
wherein $P_{i,j}$ is an amount of power allocated from antenna i of the plurality of antennas to subcarrier j of the plurality of subcarriers,
wherein $P_T$ is the total allowed transmit power,
wherein $P_U$ is a maximum amount of power that can be allocated to any subcarrier from the plurality of antennas, and
wherein M is the modulation and C is the coding rate of the function F.

12. The wireless transmitter of claim 11, wherein when one antenna of the plurality of antennas is to be allocated per subcarrier, the controller to perform the iterative reallocation according to a maximization solution of:

$$\sum_{\substack{i=1\\i\ne S}}^{K} P_{i,j}=0 \text{ and } P_U > P_{S,j} \ge 0,$$

where S is an antenna assigned to transmit on subcarrier j.

13. The wireless transmitter of claim 9, wherein the wireless transmitter utilizes orthogonal frequency division multiplexing (OFDM) transmission standard.

14. A non-transitory computer-readable storage medium comprising instructions that, when executed by a processor of a wireless transmitter, causes the processor to:
   determine a minimum number of subcarriers to achieve a target signal-to-noise ratio (SNR) value for delivery of a signal using a particular modulation and coding rate;
   identify a first set of subcarriers of a plurality of subcarriers having SNR values that exceed the target SNR value;
   identify a second set of subcarriers having SNR values that are below the target SNR value; and
   iteratively reallocate power from the first and second set of subcarriers to a third set of subcarriers having SNR values that are below the target SNR value but closer to the target SNR value than the second set of subcarriers, until at least the minimum number of subcarriers is reached, wherein the third set of subcarriers receives the reallocated power.

15. The non-transitory computer-readable storage medium of claim 14, wherein power is iteratively reallocated from the first set of subcarriers before being iteratively reallocated from the second set of subcarriers, and wherein a total transmission power of the transmitter is fixed.

16. The non-transitory computer-readable storage medium of claim 14, wherein the predetermined modulation and coding rate is selected by iteratively increasing a modulation and coding rate until a highest modulation and coding rate is reached that supports the target SNR value.

17. The non-transitory computer-readable storage medium of claim 14, wherein the iterative reallocation is performed such that the first set of subcarriers are left with SNR values that are at least equal to the target SNR value, and wherein the iterative reallocation is performed such that at least one of the third set of subcarriers achieves an SNR value that is at least equal to the target SNR value.

18. The non-transitory computer-readable storage medium of claim 14, wherein one antenna of a plurality of antennas of the transmitter is allocated per subcarrier of the plurality of subcarriers.

19. The non-transitory computer-readable storage medium of claim 14, wherein identifying the second set of subcarriers includes determining subcarriers that cannot meet the target SNR value even when power is reallocated to such subcarriers.

20. The non-transitory computer-readable storage medium of claim 14, wherein the iterative reallocation is performed until there are no more subcarriers in the first and second set of subcarriers to reallocate power from, and wherein the iterative reallocation is performed until there are no more subcarriers in the third set of subcarriers to reallocate power to.

* * * * *